Patented Sept. 6, 1927.

1,641,677

UNITED STATES PATENT OFFICE.

CHARLES B. HILL, OF GLENCOE, AND MAURICE H. GIVENS, OF EVANSTON, ILLINOIS, ASSIGNORS TO NORTHWESTERN YEAST COMPANY, OF CHICAGO, ILLINOIS, A CORPORATION OF ILLINOIS.

DRY YEAST AND METHOD FOR PRODUCING THE SAME.

No Drawing. Application filed May 25, 1926. Serial No. 111,634.

This invention relates to a novel process, hitherto unknown, for growing yeast and drying it so that the resultant yeast product has an increased raising and fermenting power, when used for bread making,—the term "dry yeast" meaning a product containing yeast cells, in the presence of organic and inorganic substances, dehydrated so that the moisture content lies between eight (8) and fourteen (14) per cent.

The objects of this invention are: To produce a dry yeast of high cell content and special composition in which the yeast cells are prenourished before partial dehydration, thereby storing up food within their walls to better withstand the deleterious effect of drying; to furnish the yeast with yeast nourishing, inorganic salts on which to so feed both before and after drying; to limit the use of the inorganic salts during the initial growing of the yeast so that while an acid reaction unfavorable to the yeast will be prevented, one inimical to bacteria established during the drying of the yeast and also later in the making of dough is produced; and to provide in the final yeast product the malt usually added to the yeast in the baking process so that the final dry yeast needs no additions of malt for use in commercial baking. In this last respect, this application is an improvement upon our prior application, Serial Number 92,331, filed March 4, 1926.

The invention consists in economically and cheaply attaining the foregoing and other objects, thereby producing a product and using a process which differs materially from the well known dried yeasts of the prior art and their manners of production. More specifically, the invention consists in giving yeast cells inorganic salts and malt to feed on, stopping the feeding before the salts and malt are consumed whereby the yeast and the unconsumed parts of the salts and malt are carried together to market in such a condition that the feeding operation can be and is resumed when the yeast is set to leavening. The invention further consists in details and features more fully set forth in the specification and claims.

The dried yeast of this invention can be used in commercial baking, whereas heretofore it has not been profitable for the baker to use such a type of leavening agent. To the commercial baker, the use of this invention means a saving in time and labor; eliminates the necessity for the usual yeast foods and malt and produces a better bread with a more palatable crust and enlarged final loaf volume. With the yeast of this invention there is no requirement for cold storage, as with compressed and wet yeasts, and hence its easy handling is facilitated.

The following is an example of the manner in which the process of this invention may be carried out:

To 1.5 lbs. yeast, in a suitable container, add 0.03 lb. salt, 0.12 lb. sugar and 3.75 lbs. water at 90 degrees F., mix and let stand 2 hours. Add slowly 1.36 lbs. rye flour and again let stand at a temperature of 80–85 degrees F. for 3 hours. For convenience, call this completed mixture "A".

Into 8.5 lbs. boiling water drop .04 lbs. hops, enclosed in a cheesecloth bag, and maintain the boiling for one-half hour. Remove the hop bag and add boiling water to make up to original volume. To this hot hop extract add——with stirring—2.72 lbs. corn meal and then cover and let stand 5 minutes until temperature reaches 176°–178° F. Now stir into this mixture 2.72 lbs. rye flour, 7.55 lbs. water and .7 lbs. commercial malt. Attention is here called and it is to be noted that the amount of malt used at this point is only sufficient for the necessary amount of mashing required of the foregoing cereals. Let this entire mixture stand until temperature falls to 95 degrees F. and then stir into it mixture "A". Let the whole stand for 1½ hours at a temperature of 80 to 90 degrees F. and then thoroughly stir in .04 lbs. salt. For convenience, designate this completed mixture "B".

Place all of "B" in a mechanical mixer and, after some little preliminary stirring, incorporate 7¼ lbs. rye flour and 8.5 lbs. water at a temperature of 80–85 degrees F. Now add, with mixing, 16¾ lbs. corn meal and let stand for 2½ hours at 80 to 90 degrees F. This completed mixture is, for convenience, designated "C".

To 12.0 lbs. of corn meal, add yeast nourishing inorganic salts, specifically 1.875 lbs. of ammonium sulphate $(NH_4)_2SO_4$, 0.9375 lbs. of calcium phosphate $Ca_3(PO_4)_2$ and 0.9375 lbs. of calcium sulphate, $CaSO_4.2H_2O$ and thoroughly mix these substances. Now to this whole mixture of corn meal and inorganic salts add 18.75 lbs. of malt and again thoroughly mix. Attention is here called and it is to be further noted that the amount of malt added at this time and place is not primarily for mashing purposes, but in order to supply the yeast an excess of malt so that the yeast will have some malt to feed on during the drying operation and an abundance for its further nourishment when the yeast is used in leavening operations. It is of course obvious that the amount of malt is also decidedly over and above the amount required for any mashing operation. Call this "D".

When "C" has stood for the time indicated, thoroughly mix "D" into it, adding 10 pounds water at 82° F., and roll the whole out into a dough and cut into desired size cakes. During this mixing, the yeast in "C" starts to feed on the inorganic salts and malt of "D" and this continues during the early stages of the drying hereafter described. Place these cakes in a drying room having a temperature of 80 to 90 degrees F. and keep them there until the moisture has been reduced to 8–14 per cent. The completion of the drying operation arrests the feeding of the yeast on the inorganic salts and malt and leaves the unconsumed or uneaten parts of the salts and malt with the yeast ready for consumption when the yeast is later used for leavening. The yeast is now ready for use in commercial baking by simply adding some of the water and sugar usually used in baking and letting the mixture stand at 80 to 90 degrees F. for 15 hours, when it can be used in lieu of any so-called compressed yeast.

The foregoing description gives a typical procedure, but it is evident and is to be understood that the whole operation includes variable elements and hence the details of procedure may be widely varied, without departure from the spirit of the invention or the scope of the subjoined claims. Attention is called to these facts: Namely, there is variation in the moisture content of grains and there is variation in the growing and fermenting ability of different species of yeasts.

The moisture is so regulated in the dough from "D" that, during the subsequent and final drying, the yeast uses part only of the inorganic salts and malt and leaves a remainder for its further use, when water is added to it to make the final yeast starter for making bread dough. The yeast, in using part of the inorganic salts and malt stores up in its cells some of the inorganic radicals, so that it can better withstand the deleterious effect of dehydrating and, further, it produces, by its use, other inorganic substances, as, for example, sulphuric acid, which is inimical to bacterial growth, but in the amount here permitted to be formed, is not injurious to the yeast nor preventive of yeast growth. There are also other biochemical reactions occurring, which can now be recognized by those familiar with the science and trade of yeast growing. It is self-evident now how process of this invention differs from any already disclosed or known because in these latter cases, the inorganic salts have been used, as a rule, for growing yeast in clear wort and any unconsumed, inorganic salts, together with the secondary products formed by the action of the yeast on the inorganic salts, have always been removed from the yeast before its use or preservation.

As many changes could be made in carrying out the above method, even to adding other substances, as spices and flavoring extracts, without departing from the scope of the invention, it is intended that all matter contained in the above description shall be interpreted as illustrative and not in a limiting sense.

In drying the final product, 80 to 90 degrees F. are best but 60° to 100° may be used.

Attention is called to the fact that the partial consumption only of the inorganic salts and malt is controlled in two ways: (a) by drying; and (b) by inserting the salts and second addition of malt so late in the operation described that the yeast does not have time to consume all the salts and malt before drying starts. That is to say, if the salts and all the malt were fed in early in the process, they would be entirely consumed by the yeast before the drying starts.

It is desirable to use a mixture of inorganic salts, but a single one may be used with the malt without entirely destroying the invention.

By inorganic salts is meant, at all points in the specification and claims, those which are suitable to nourish yeast.

By the term "malt" is meant either ground malted grains in any form, or any extract thereof. The use, generically of a composition of matter composed of ammonium sulphate, calcium sulphate, calcium phosphate $(Ca_3(PO_4)_2)$ in bread making is set forth and claimed in our companion application Serial No. 160,299, filed January 10, 1927.

Having thus described our invention, what we claim as new and desire to secure by Letters Patent is:

1. The process which comprises growing yeast on a mixture of predetermined quantities of ground cereals, a yeast nourishing inorganic salt and malt, said malt being in a quantity substantially in excess of that required to mash the cereals, and stopping the action of the yeast on the inorganic salt and malt prior to their complete consumption by the yeast, whereby the yeast thenceforth carries associated with it the cereals, said unconsumed inorganic salt and derivatives thereof as well as said excess of malt, all of these last named substances being now ready for feeding the yeast when the yeast is used in leavening operations.

2. The process which comprises growing yeast on a mixture of predetermined quantities of ground cereals, sugar, a yeast nourishing inorganic salt and malt, said malt being in a quantity substantially in excess of that required to mash the cereals, and stopping the action of the yeast on the inorganic salt and malt prior to their complete consumption by the yeast, whereby the yeast thenceforth carries associated with it the cereals, said unconsumed inorganic salt and derivatives thereof as well as said excess of malt, all of these last named substances being now ready for feeding the yeast when the yeast is used in leavening operations.

3. The process which comprises growing yeast on a mixture of predetermined quantities of ground cereals, hop water, a yeast nourishing inorganic salt and malt, said malt being in a quantity substantially in excess of that required to mash the cereals, and stopping the action of the yeast on the inorganic salt and malt prior to their complete consumption by the yeast, whereby the yeast thenceforth carries associated with it the cereals, said unconsumed inorganic salt and derivatives thereof as well as said excess of malt, all of these last named substances being now ready for feeding the yeast when the yeast is used in leavening operations.

4. The process which comprises growing yeast on a mixture of predetermined quantities of ground cereals, sugar, hop water, a yeast nourishing inorganic salt and malt, said malt being in a quantity substantially in excess of that required to mash the cereals, and stopping the action of the yeast on the inorganic salt and malt prior to their complete consumption by the yeast, whereby the yeast thenceforth carries associated with it the cereals, said unconsumed inorganic salt and derivatives thereof as well as said excess of malt, all of these last named substances being now ready for feeding the yeast when the yeast is used in leavening operations.

5. The process which comprises growing yeast on a mixture of predetermined quantities of ground cereals, yeast nourishing inorganic salts and malt, said malt being in a quantity substantially in excess of that required to mash the cereals, and stopping the action of the yeast on the inorganic salts and malt prior to their complete consumption by the yeast, whereby the yeast thenceforth carries associated with it the cereals, said unconsumed inorganic salts and derivatives thereof as well as said excess of malt, all of these last named substances being now ready for feeding the yeast when the yeast is used in leavening operations.

6. The process which comprises growing yeast on a mixture of predetermined quantities of ground cereals, sugar, yeast nourishing inorganic salts and malt, said malt being in a quantity substantially in excess of that required to mash the cereals, and stopping the action of the yeast on the inorganic salts and malt prior to their complete consumption by the yeast, whereby the yeast thenceforth carries associated with it the cereals, said unconsumed inorganic salts and derivatives thereof as well as said excess of malt, all of these last named substances being now ready for feeding the yeast when the yeast is used in leavening operations.

7. The process which comprises growing yeast on a mixture of predetermined quantities of ground cereals, hop water, yeast nourishing inorganic salts and malt, said malt being in a quantity substantially in excess of that required to mash the cereals, and stopping the action of the yeast on the inorganic salts and malt prior to their complete consumption by the yeast, whereby the yeast thenceforth carries associated with it the cereals, said unconsumed inorganic salts and derivatives thereof as well as said excess of malt, all of these last named substances being now ready for feeding the yeast when the yeast is used in leavening operations.

8. The process which comprises growing yeast on a mixture of predetermined quantities of ground cereals, sugar, hop water, yeast nourishing inorganic salts and malt, said malt being in a quantity substantially in excess of that required to mash the cereals, and stopping the action of the yeast on the inorganic salts and malt prior to their complete consumption by the yeast, whereby the yeast thenceforth carries associated with it the cereals, said unconsumed inorganic salts and derivatives thereof as well as said excess of malt, all of these last named substances being now ready for feeding the yeast when the yeast is used in leavening operations.

9. The process which comprises growing yeast on rye flour and corn meal in the presence of sugar, malt, hop water, sodium chloride, ammonium sulphate, calcium phosphate, calcium sulphate, stopping the action of the yeast on these inorganic salts prior to their complete consumption by the yeast whereby the yeast thenceforth carries associated with it said unconsumed inorganic salts and derivatives thereof, ready for feeding the yeast when the yeast is used in leavening operations, and drying, the malt being in excess of that required to mash the rye flour and corn meal.

10. The process which comprises growing yeast on rye flour and corn meal in the presence of sugar, malt, hop water and inorganic salts, stopping the action of the yeast on these inorganic salts prior to their complete consumption by the yeast, whereby the yeast thenceforth carries associated with it said unconsumed inorganic salts and derivatives thereof, ready for feeding the yeast when the yeast is used in leavening operations and drying resultant product, prior to exhaustion of the salts and malt at a temperature of 80 to 90 degrees F. to a moisture content of less than 14 per cent., the malt being in excess of that required to mash the rye flour and corn meal.

11. The process which comprises growing yeast on rye flour and corn meal in the presence of sugar, malt, hop water, sodium chloride, ammonium sulphate, calcium phosphate and calcium sulphate stopping the action of the yeast on these inorganic salts prior to their complete consumption by the yeast, whereby the yeast thenceforth carries associated with it said unconsumed inorganic salts and derivatives thereof, ready for feeding the yeast when the yeast is used in leavening operations and drying the resultant product at a temperature of 80 to 90 degrees F. to a moisture content of less than 14 per cent., the malt being in excess of that required to mash the rye flour and corn meal.

12. A dried yeast product consisting essentially of live yeast cells, ground cereals, ammonium sulphate, calcium sulphate, calcium phosphate $(Ca_3(PO_4)_2)$, and radicals split off from these salts and unconsumed malt with a moisture content of less than 14 per cent.

In witness whereof, we have hereunto subscribed our names.

CHARLES B. HILL.
MAURICE H. GIVENS.